United States Patent [19]

Watanabe et al.

[11] Patent Number: 4,736,257
[45] Date of Patent: Apr. 5, 1988

[54] INFORMATION SIGNAL RECORDING MEDIUM REPRODUCING APPARATUS WITH AN IMPROVED EQUALIZER

[75] Inventors: Yasuaki Watanabe, Kasukabe; Kazuo Yamada, Noda; Hiroji Ibaraki, Showa, all of Japan

[73] Assignee: Victor Company of Japan, Ltd., Yokohama, Japan

[21] Appl. No.: 765,337

[22] Filed: Aug. 13, 1985

[30] Foreign Application Priority Data

Aug. 22, 1984 [JP] Japan .................... 59-174414

[51] Int. Cl.$^4$ ........................... H04N 5/76
[52] U.S. Cl. ..................... 358/340; 358/336; 358/342; 360/65; 369/48; 369/107; 369/124
[58] Field of Search ........... 358/335, 336, 340, 330, 358/342; 360/29, 30, 33.1, 38.1, 65; 369/48, 32, 107, 109, 48, 124

[56] References Cited

U.S. PATENT DOCUMENTS 4,360,829 11/1982 Riddle .................... 358/340
4,509,155 4/1985 Masuda et al. .......... 369/48
4,512,005 4/1985 Okano .................... 369/48

FOREIGN PATENT DOCUMENTS 1462409 3/1971 Fed. Rep. of Germany.

Primary Examiner—Robert L. Richardson
Attorney, Agent, or Firm—Ladas & Parry

[57] ABSTRACT

An information signal recording medium reproducing apparatus comprises an equalizer supplied with a frequency modulated composite video signal picked up from an information signal recording medium, a frequency demodulator for frequency-demodulating an output signal of the equalizer into a composite video signal, a synchronizing signal separating circuit for separating a horizontal synchronizing signal from the composite video signal, and a switching signal generating circuit for forming a switching signal from the horizontal synchronizing signal. The equalizer is supplied with the switching signal and has such a circuit construction that a frequency at which an output level versus frequency characteristic of the equalizer has a peak is reduced responsive to the switching signal during a predetermined time period in a vicinity of the front edge of the horizontal synchronizing signal to correct a distorted waveform of the frequency modulated composite signal caused by defects in the information signal recording medium.

6 Claims, 5 Drawing Sheets

INFORMATION SIGNAL RECORDING MEDIUM REPRODUCING APPARATUS WITH AN IMPROVED EQUALIZER

BACKGROUND OF THE INVENTION

The present invention generally relates to information signal recording medium reproducing apparatuses, and more particularly to an information signal recording medium reproducing apparatus provided with a demodulating circuit for demodulating a frequency modulated composite information signal which is reproduced from an information signal recording medium.

A rotary recording medium (hereinafter simply referred to as a disc) which is recorded with a frequency modulated composite video signal as variations (existence and non-existence of pits) in geometrical configuration, which frequency modulated composite video signal is obtained by frequency-modulating a carrier by a composite video signal, and a reproducing apparatus for reproducing the recorded frequency modulated composite video signal from the disc, have been developed and reduced to practice, and the disc and the reproducing apparatus are put into wide and general use. The reproducing apparatus scans the disc by an electrostatic capacitance type stylus (or laser beam), and picks up the recorded frequency modulated composite video signal from the disc responsive to variations in the electrostatic capacitance between the stylus and the disc, which variations in the electrostatic capacitance are in accordance with the variations in the geometrical configuration of the disc. The frequency modulated composite video signal which is picked up, is frequency-demodulated into a reproduced composite video signal. The disc is also recorded with an audio signal, and the signals which are recorded on the disc will hereinafter be generally referred to as an information signal.

The frequency modulated composite video signal which is recorded on the disc of the type described above, is a signal which has been subjected to such a frequency modulation that a white peak of the composite video signal corresponds to an upper limit (for example, 7.9 MHz) of the frequency deviation and the tip end of the horizontal synchronizing signal (so-called sync tip) corresponds to a lower limit (for example, 6.1 MHz) of the frequency deviation. Accordingly, the interval of the pits which are formed on the disc in accordance with the frequency modulated composite video signal, is narrow at a recorded part corresponding to the white level of the composite video signal and is wide at a recorded part corresponding to the horizontal synchronizing signal of the composite video signal.

However, in the case where scratches and the like exist on a stamper at the time when the disc is molded, or in the case where foreign particles and the like are mixed into a material from which the disc is molded, unwanted pits (false pits) are formed on the disc in addition to the pits of the recorded signal. When such false pits exist on the disc, the frequency modulated signal is picked up as a signal having a higher frequency at parts on the disc where the false pits exist. Especially in the case where the false pits exist on the disc at a recorded part corresponding to a horizontal synchronizing signal, the part of the frequency modulated signal corresponding to the horizontal synchronizing signal is picked up as a signal having a high frequency, and the waveform of the demodulated horizontal synchronizing signal becomes distorted when the picked up signal is demodulated.

On the other hand, the horizontal synchronizing signal within the composite video signal which is picked up from the disc and demodulated (reproduced), is separated from the reproduced composite video signal and is used for various purposes such as obtaining a control signal for carrying out jitter compensation and control of a reproducing element of the reproducing apparatus and obtaining a control signal for an automatic frequency control (AFC) circuit of a television receiver. Especially the front edge of the horizontal synchronizing signal is used when obtaining such control signals. However, when the front edge part of the horizontal synchronizing signal is missing or the waveform at the front edge part of the horizontal synchronizing signal is distorted due to the false pits described before, the above control signals cannot be obtained properly. As a result, there are problems in that it becomes impossible to carry out a satisfactory jitter compensation and the receiver becomes out of horizontal synchronism. Hence, it is extremely important that the horizontal synchronizing signal within the reproduced composite video signal, especially the front edge part of the horizontal synchronizing signal, is not missing nor distorted.

SUMMARY OF THE INVENTION

Accordingly, it is a general object of the present invention to provide a novel and useful information signal recording medium reproducing apparatus in which the problems described heretofore are eliminated.

Another and more specific object of the present invention is to provide an information signal recording medium reproducing apparatus in which a reproduced horizontal synchronizing signal is unaffected by the existence of unwanted false pits on a disc at a recorded part corresponding to the horizontal synchronizing signal within a frequency modulated composite video signal. In order to achieve this, the reproducing apparatus according to the present invention is designed to reduce the frequency of the frequency modulated composite video signal which is picked up from the disc during a time period corresponding to the horizontal synchronizing signal, so as to reduce the level of the picked up frequency modulated composite video signal during the time period corresponding to the horizontal synchronizing signal. Hence, even when the false pit exists during the time period corresponding to the horizontal synchronizing signal, the level of the picked up frequency modulated composite video signal is reduced during this time period, and undesirable effects of the false pit will not be introduced in the demodulated signal.

Still another object of the present invention is to provide an information signal recording medium reproducing apparatus which is designed to reduce the frequency of the picked up frequency modulated composite video signal during a time period including a part corresponding to the front edge of the horizontal synchronizing signal, and wherein the reduction of the frequency is performed by switching the connection of circuit elements constituting a tank circuit of an equalizer during the above time period.

Other objects and further features of the present invention will be apparent from the following detailed description when read in conjunction with the accompanying drawings.

DETAILED DESCRIPTION

Figure 1:
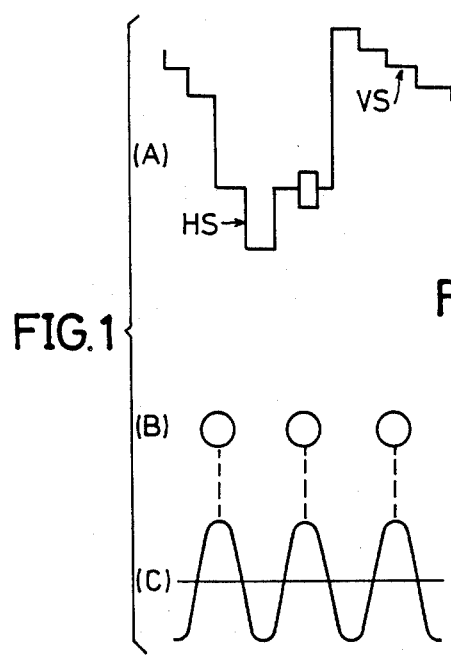
FIGS. 1(A) through 1(C) respectively show a horizontal synchronizing signal part of a recorded signal, a pit part on a disc corresponding to a front edge of the horizontal synchronizing signal, and the waveform of a frequency modulated signal which is picked up and obtained by scanning over this pit part.

Generally, a composite video signal comprises a horizontal synchronizing signal part HS and a video signal part VS as shown in FIG. 1 (A). The composite video signal also comprises a vertical synchronizing signal part, but the illustration thereof will be omitted. FIG. 1(B) shows an example of recorded pits on the disc corresponding to the front edge of the horizontal synchronizing signal part HS. The waveform of a frequency modulated signal picked up by scanning over the recorded pits by a reproducing element, is shown in FIG. 1(C).

Figure 2:
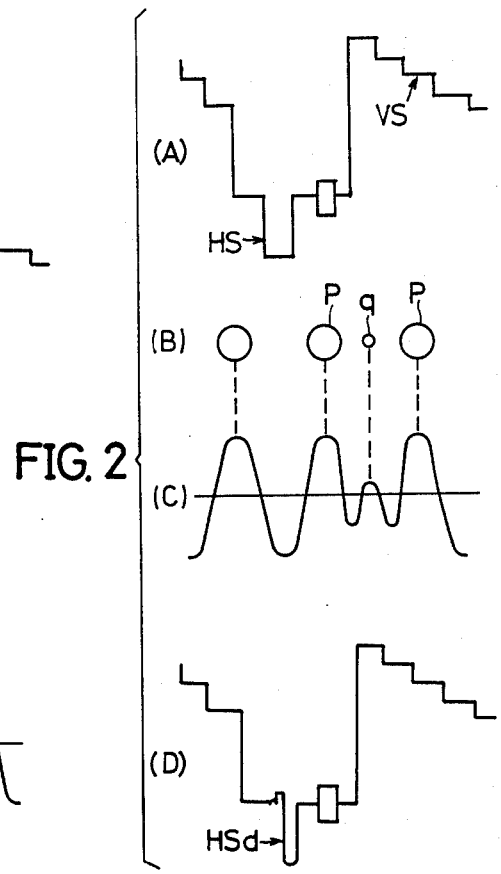
FIGS. 2(A) through 2(D) respectively show the horizontal synchronizing signal part of the recorded signal, a pit part on the disc corresponding to the front edge of the horizontal synchronizing signal when false pits exist on the disc, the waveform of a frequency modulated signal which is picked up and obtained by scanning over this pit part, and the waveform of a horizontal synchronizing signal part which is obtained by frequency-demodulating the picked up frequency modulated signal.

However, as described before, there are cases where unwanted false pits are formed on the disc due to some cause at parts other than the parts where the pits of the signal are originally formed. For example, when a false pit q is formed between original pits P corresponding to the front edge of the horizontal synchronizing signal part HS as shown in FIG. 2(B), the waveform of a frequency modulated signal picked up by a scanning over the pits P and q by the reproducing element becomes as shown in FIG. 2(C). As may be seen from FIG. 2(C), due to the existence of the false pit q, the frequency of the frequency modulated signal becomes high in the vicinity of the false pit q. The frequency depends on the state of the false pit q, but especially the frequencies in the range of 10 MHz to 12 MHz become a problem. When the picked up signal is frequency-demodulated, the waveform of the demodulated signal becomes distorted in the direction of the white level from the regular state, because the frequency of the frequency modulated signal is high at a part thereof corresponding to the front edge of the horizontal synchronizing signal part HS. For this reason, a demodulated horizontal synchronizing signal part HSd shown in FIG. 2(D) lacks the regular front edge part thereof and the waveform at the front porch part of the pedestal thereof is distorted. Accordingly, as may be seen by comparing FIGS. 2(A) and 2(D), the part which should originally be demodulated as the horizontal synchronizing signal part HS is demodulated as the horizontal synchronizing signal part HSd. When the horizontal synchronizing signal part HSd is extracted and a control signal is generated by use of the front edge of the horizontal synchronizing signal part HSd, this control signal becomes different from the regular control signal which is generated by use of the front edge of the horizontal synchronizing signal part HS. Therefore, depending on the kind of the control signal, inconveniences such as the following are introduced. That is, it may become impossible to accurately control and compensate for the jitter of the reproducing element of the reproducing apparatus. Further, it may become impossible to appropriately perform an automatic frequency control operation in the television receiver, and in this case, the horizontal synchronism is consequently not maintained in a normal synchronized state and the horizontally scanning part becomes shifted horizontally in the picture.

The present invention is designed so that the waveform of the demodulated horizontal synchronizing signal part will not become distorted even when the false pit q described above exists. Description will hereinafter be given with respect to an embodiment of the present invention.

Figure 3:
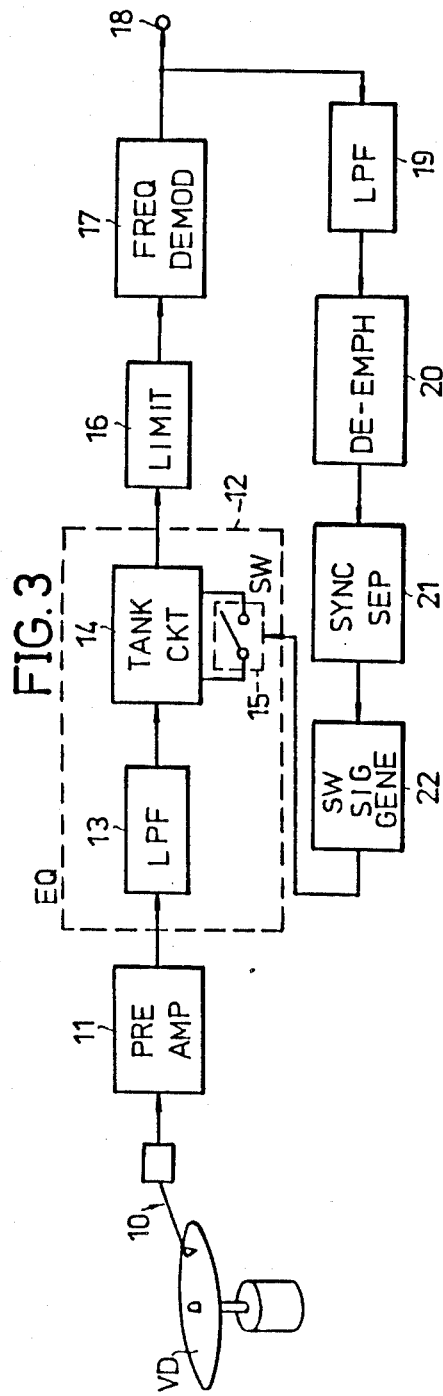
FIG. 3 is a system block diagram showing an essential part of an embodiment of the information signal recording medium reproducing apparatus according to the present invention.

In FIG. 3, a frequency modulated composite video signal which is picked up from a disc VD by a known reproducing element 10, is passed through a preamplifier 11 and is supplied to a lowpass filter 13 of an equalizer 12. The signal which is eliminated of the unwanted high-frequency component thereof in the lowpass filter 13, is passed through a tank circuit 14 and is supplied to a limiter 16. As will be described later on in the specification, a switching circuit 15 is connected to the tank circuit 14, and the connections of internal circuit elements of the tank circuit 14 is switched responsive to the opening and closing of the switching circuit 15.

The frequency modulated composite video signal which is eliminated of the unwanted amplitude deviation component in the limiter 16, is frequency-demodulated in a frequency demodulator 17. An output demodulated composite video signal of the frequency demodulator 17 is obtained through an output terminal 18 and is supplied to circuits in the subsequent stage including a de-emphasis circuit.

Figure 5:
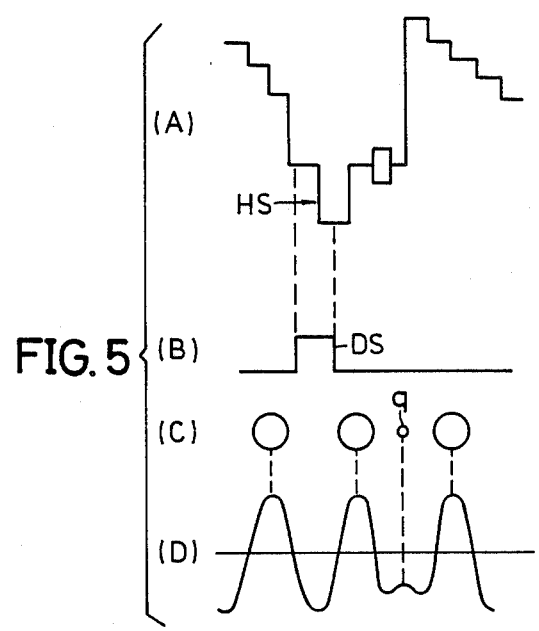
FIGS. 5(A) through 5(D) respectively show the horizontal synchronizing signal part of the recorded signal, the waveform of a switching signal obtained from a pulse generating circuit shown in FIG. 3, a pit part on the disc when false pits exist, and the waveform of a picked up frequency modulated signal which is obtained through the equalizer shown in FIG. 3.

On the other hand, the output demodulated composite video signal of the frequency demodulator 17 is also supplied to a lowpass filter 19 wherein the unwanted high-frequency component is eliminated. An output signal of the lowpass filter 19 is supplied to a de-emphasis circuit 20. At the time of the recording, the composite video signal is subjected to a pre-emphasis in a recording system which records the signal on the disc, and for this reason, it is necessary in a reproducing system to carry out a de-emphasis complementary to the pre-emphasis carried out at the time of the recording. An output signal of the de-emphasis circuit 20 is supplied to a synchronizing signal separating circuit 21. The horizontal synchronizing signal within the composite video signal shown in FIG. 5(A) is separated in the synchronizing signal separating circuit 21, and the separated horizontal synchronizing signal is supplied to a switching signal generating circuit 22. Based on the separated horizontal synchronizing signal from the synchronizing signal separating circuit 21, the switching signal generating circuit 22 generates a switching signal DS which exists for a time period including the front edge of the horizontal synchronizing signal part HS and the vicinity of the front edge as shown in FIG. 5(B).

The switching signal DS is applied to the switching circuit 15 which is connected of the tank circuit 14 of the equalizer 12, and the switching circuit 15 is closed during the time period in which the switching signal DS exists. As will be described later on by referring to a concrete circuit example, the tank circuit 14 comprises a tank circuit made up of circuit elements such as a coil, capacitors, and resistors, and the tank circuit is connected to or not connected to other circuit elements such as a capacitor depending on the open or closed state of the switching circuit 15. Accordingly, the frequency characteristic of the tank circuit 14 as a whole is switched responsive to the switching of the switching circuit 15.

Figure 4:
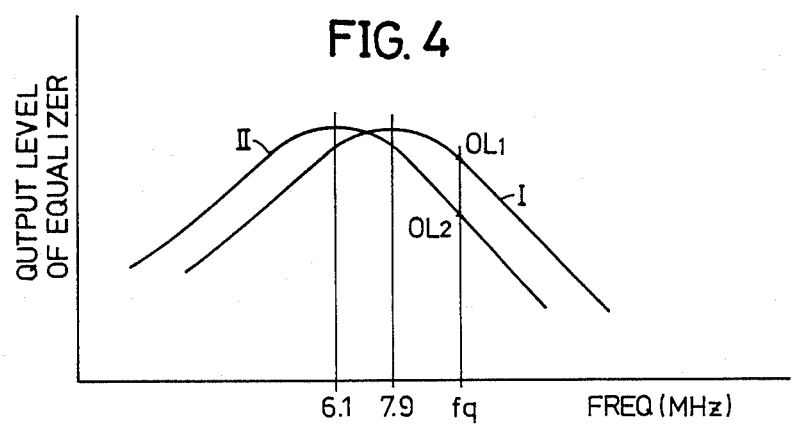
FIG. 4 is a graph showing an output characteristic of an equalizer shown in FIG. 3.

When the switching signal DS is not applied to the switching circuit 15, an output level versus frequency characteristic of the equalizer 12 which is determined by the frequency characteristic of the tank circuit 14 in this state, becomes as indicated by a curve I in FIG. 4. On the other hand, the switching circuit 15 is closed when the switching signal DS is applied thereto, and the output level versus frequency characteristic of the equalizer 12 in this state becomes as indicated by a curve II in FIG. 4. As may be seen from FIG. 4, the frequency (center frequency) corresponding to the peak of the curve II decreases compared to that of the curve I. In the present embodiment, the frequency corresponding to the peak of the curve I is 7.9 MHz, and the frequency corresponding to the peak of the curve II is 6.1 MHz. Hence, even when a frequency component indicated by $f_q$ is picked up due to the false pit q shown in FIG. 5(C) which exists on the disc at the position corresponding to the vicinity of the front edge of the horizontal synchronizing signal, the output level versus frequency characteristic of the equalizer 12 is changed from the curve I to the curve II during the time period in which the switching signal DS exists, where the time period includes the point in time when the frequency component $f_q$ is picked up. As a result, the output level of the frequency component $f_q$ is greatly reduced from a level $OL_1$ to a level $OL_2$. In other words, the signal which is picked up as a signal having the waveform shown in FIG. 2(C) is reduced of the level of the high-frequency component by being passed through the equalizer 12, and is obtained as a signal having the waveform shown in FIG. 5(D) wherein the high-frequency component is substantially depressed. For this reason, when the signal having the waveform shown in FIG. 5(D) is demodulated in the frequency demodulator 17, it is possible to obtain a horizontal synchronizing signal part HS which has a waveform approximately the same as that shown in FIG. 5(A) and does not lack the front edge part thereof.

When the depression signal DS ceases, the switching circuit 15 opens, and the output level versus frequency characteristic of the equalizer 12 returns to the curve I from the curve II. Hence, the video signal passes through the equalizer 12 having the output level versus frequency characteristic I.

Figure 6:
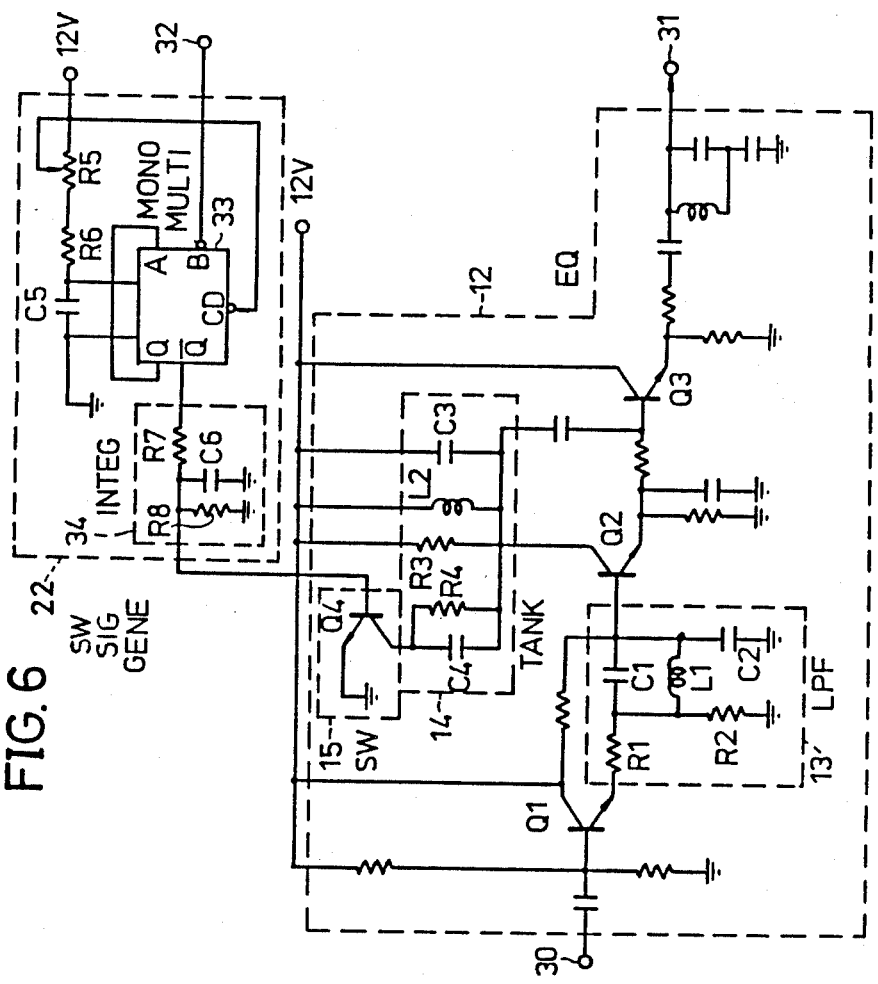
FIG. 6 is a circuit diagram showing an embodiment of a concrete circuit of an essential part of the block system shown in FIG. 3.

FIG. 6 shows an embodiment of a concrete circuit of an essential part of the block system shown in FIG. 3. The frequency modulated composite video signal which is picked up from the disc VD and is applied to an input terminal 30, is passed through the lowpass filter 13 which comprises a transistor Q1, resistors R1 and R2, capacitors C1 and C2, and a coil L1. The output signal of the lowpass filter 13 is passed through transistors Q2 and Q3, and an output signal of the equalizer 12 is obtained through an output terminal 31. The output signal of the equalizer 12 is supplied to the limiter 16 provided in the subsequent stage.

The tank circuit 14 which comprises capacitors C3 and C4, a coil L2, and resistors R3 and R4, is connected to a collector of the transistor Q2 which constitutes an inverting amplifier. The capacitor C3 and the resistor R4 are connected to a collector of a transistor Q4 which constitutes the switching circuit 15.

Figure 7:
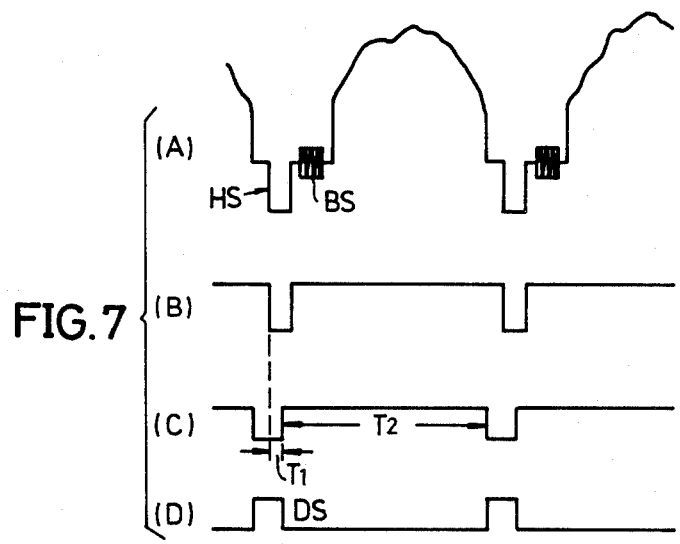
FIGS. 7(A) through 7(D) show signal waveforms for explaining the timing with which the switching signal is obtained from the reproduced horizontal synchronizing signal.

The horizontal synchronizing signal shown in FIG. 7(B) which is separated from the composite video signal shown in FIG. 7(A) in the synchronizing signal separating circuit 21, is applied to an input terminal 32 and is supplied to a monostable multivibrator 33 which constitutes the switching signal generating circuit 22. The monostable multivibrator 33 is triggered by the front edge of the separated horizontal synchronizing signal. A signal shown in FIG. 7(C) which rises after a delay time T1 of the monostable multivibrator 33 from the time when the monostable multivibrator 33 is triggered and then falls after a time T2 corresponding to a time constant determined by resistors R5 and R6 and a capacitor C5, is obtained through an output terminal Q of the monostable multivibrator 33. A signal shown in FIG. 7(D) having an inverted waveform of the signal obtained from the output terminal Q of the monostable multivibrator 33, is obtained through an output terminal $\overline{Q}$ of the monostable multivibrator 33. The signal from the output terminal $\overline{Q}$ of the monostable multivibrator 33 is passed through an integrating circuit 34 which comprises resistors R7 and R8 and a capacitor C6, and is applied as the switching signal DS to a base of the transistor Q4 which constitutes the switching circuit 15.

The transistor Q4 is OFF when the switching signal DS is not applied thereto, and in this state, the capacitor C3, the coil L2 and the resistor R3 operate within the tank circuit 14. In this state, the output level versus frequency characteristic of the equalizer 12 becomes as indicated by the curve I shown in FIG. 4. On the other hand, when the switching signal DS is applied to the transistor Q4 and the transistor Q4 is turned ON, the capacitor C4 and the resistor R4 which are connected to the transistor Q4 become connected in parallel to the capacitor C3 and the coil L2 within the tank circuit 14. As a result, the output level versus frequency characteristic of the equalizer 12 becomes as indicated by the curve II in FIG. 4, and the frequency at the peak of the curve II decreases from that of the curve I.

When the front edge of the existing time period of the switching signal DS extends within the video signal period before the front porch of the horizontal synchronizing signal, the video signal component is affected by the output level versus frequency characteristic of the equalizer 12 indicated by the curve II. For this reason, it is desirable that the front edge of the switching signal DS does not correspond to the video signal period. In addition, when the rear edge of the switching signal DS extends beyond the front edge of the horizontal synchronizing signal and extends within the time period of a burst signal BS, the burst signal BS is affected by the output level versus frequency characteristic of the equalizer 12 indicated by the curve II and the burst signal BS becomes distorted. Accordingly, as shown on an enlarged scale in FIGS. 8(A) and 8(B), it is desirable that the switching signal DS has such a width (existing time period) that the front edge of the horizontal synchronizing signal part HS is included, the front edge of the switching signal DS does not extend within the video signal period, and the rear edge of the switching signal DS does not extend within the time period of the burst signal BS.

Figure 8:
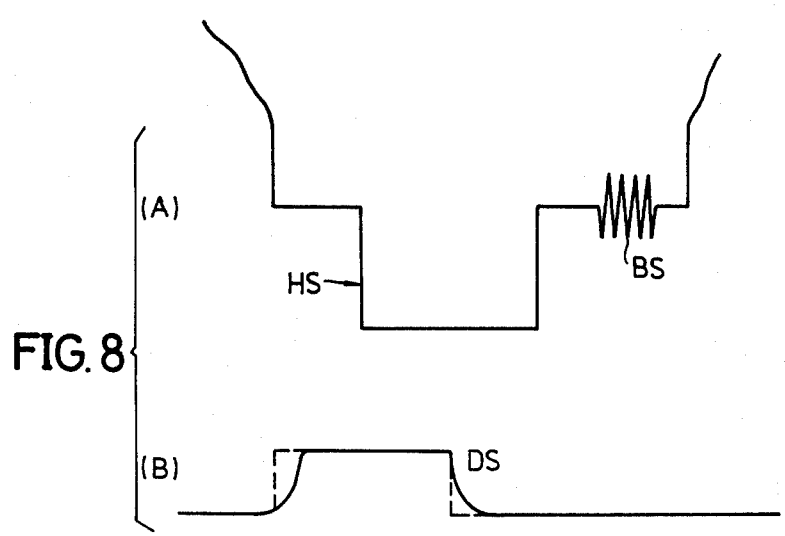
FIGS. 8(A) and 8(B) show waveforms at the horizontal synchronizing signal part and the switching signal part, respectively.

The $\overline{Q}$-output signal of the monostable multivibrator 33 has the waveform indicated by a phantom line in FIG. 8(B), but the waveform at the rising and falling edges of the $\overline{Q}$-output signal is rounded as indicated by the solid line when the $\overline{Q}$-output signal is passed through the integrating circuit 34. Hence, especially the possibility of the front edge of the switching signal DS entering within the video signal period is further reduced.

Figure 9:
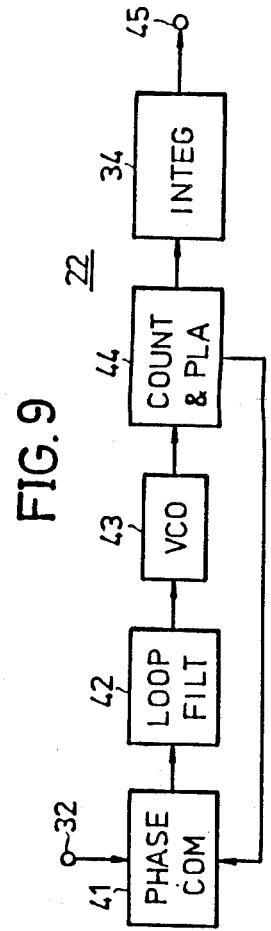
FIG. 9 is a system block diagram showing another embodiment of a concrete circuit of an essential part of the block system shown in FIG. 3.

Another embodiment of the switching signal generating circuit 22 is shown in FIG. 9. The horizontal synchronizing signal which is separated in the synchronizing signal separating circuit 21, is applied to the terminal 32 and is supplied to a phase comparator 41. An output signal of the phase comparator 41 is integrated in a loop filter 42 and is supplied to a voltage controlled oscillator (VCO) 43 so as to control the oscillation frequency thereof. The VCO 43 has an oscillation frequency which is four times a chrominance subcarrier frequency fsc of the video signal. An output signal of the VCO 43 is supplied to a counter and programmable logic array (PLA) circuit 44 wherein the frequency is counted down to a horizontal scanning frequency $f_H$ of the video signal, and an output signal of the circuit 44 is supplied to the phase comparator 41 wherein the phase is compared with the phase of the horizontal synchronizing signal obtained from the terminal 32. In addition, the output signal of the VCO 43 is counted down in a counter part of the circuit 44 and is also gated in a PLA part of the circuit 44. The PLA part of the circuit 44 generates the switching signal DS, and the depression signal is passed through the integrating circuit 34. An output signal of the integrating circuit 34 is obtained through an output terminal 45 and is applied to the base of the transistor Q4 which constitutes the switching circuit 15.

According to the present embodiment of the switching signal generating circuit 22, it is possible to accurately set the gating time period in the PLA part of the circuit 44. For this reason, it is possible to positively obtain the switching signal DS having such a width (existing time period) that the front edge of the horizontal synchronizing signal part HS is included, the front edge of the switching signal DS does not extend within the video signal period, and the rear edge of the switching signal DS does not extend within the time period of the burst signal BS.

Further, the present invention is not limited to these embodiments, but various variations and modifications may be made without departing from the scope of the present invention.

What is claimed is:

1. An information signal recording medium reproducing apparatus comprising:

an equalizer supplied with a frequency modulated composite video signal picked up from an information signal recording medium which is recorded with the frequency modulated composite video signal;

a frequency demodulator supplied with an output signal of said equalizer for frequency-demodulating the output signal of said equalizer to produce a composite video signal;

a synchronizing signal separating circuit supplied with the composite video signal from said frequency demodulator for separating a horizontal synchronizing signal from the composite video signal; and a switching signal generating circuit supplied with the horizontal synchronizing signal from said synchronizing signal separating circuit for forming a switching signal from the horizontal synchronizing signal, said equalizer being supplied with the switching signal from said switching signal generating circuit and having such a circuit construction that a peak frequency at which an output level of said equalizer becomes maximum as a function of frequency is reduced responsive to said switching signal during a predetermined time period in a vicinity of a front edge of the horizontal synchronizing signal so as to correct a distorted waveform of the frequency modulated composite video signal, said distorted waveform being caused by defects in the information signal recording medium.

2. An information signal recording medium reproducing apparatus as claimed in claim 1 in which said equalizer comprises a tank circuit and a switching circuit, said tank circuit comprising first circuit means for determining the output level versus frequency characteristic of said equalizer so that the peak of the output level versus frequency characteristic occurs at a predetermined frequency and second circuit means coupled in parallel to said first circuit means for determining the output level versus frequency characteristic of said equalizer together with said first circuit means so that the peak of the output level versus frequency characteristic occurs at a frequency lower than said predetermined frequency, said switching circuit being coupled to said second circuit means of said tank circuit and being normally open so that said second circuit means substantially does not operate, said switching circuit coupling said second circuit means in parallel to said first circuit means when said switching circuit is closed so that said second circuit means operates as a parallel circuit together with said first circuit means, said switching circuit being closed responsive to the switching signal from said switching signal generating circuit.

3. An information signal recording medium reproducing apparatus as claimed in claim 2 in which said switching circuit comprises a transistor coupled to said switching signal generating circuit so that the switching signal is applied to a base of said transistor, said transistor having an emitter thereof grounded, said second circuit means of said tank circuit having one end thereof coupled to a collector of said transistor and having the other end thereof coupled to said first circuit means of said tank circuit.

4. An information signal recording medium reproducing apparatus as claimed in claim 1 in which said switching signal generating circuit generates the switching signal so that said predetermined time period includes the front edge of the horizontal synchronizing signal, the front edge of the switching signal corresponds to a front porch of the horizontal synchronizing signal, and the rear edge of the switching signal corresponds to a sync tip of the horizontal synchronizing signal.

5. An information signal recording medium reproducing apparatus as claimed in claim 1 in which said switching signal generating circuit further comprises an integrating circuit for rounding rising and falling edges of the switching signal.

6. An information signal recording medium reproducing apparatus as claimed in claim 2 in which said predetermined frequency is equal to 7.9 MHz, and said frequency lower than said predetermined frequency is equal to 6.1 MHz.

* * * * *